Figure 1:
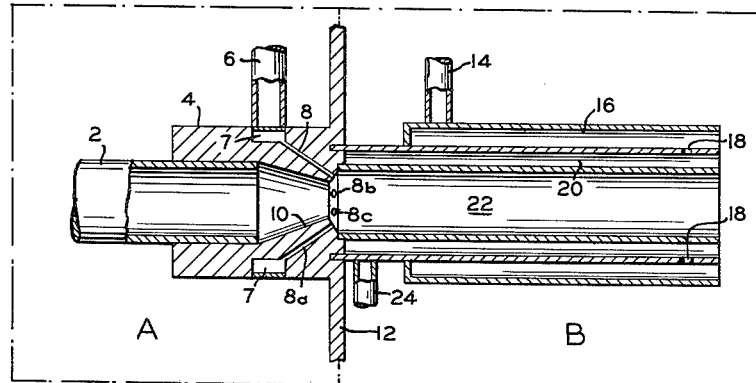

Aug. 7, 1962 J. B. DWYER 3,048,476
CONVERSION OF HYDROCARBONS AND CARBONACEOUS MATERIALS
Filed April 27, 1955 2 Sheets-Sheet 1

*INVENTOR.*
JOHN B. DWYER
BY
*L. H. Palmer*
ATTORNEYS

Aug. 7, 1962 J. B. DWYER 3,048,476
CONVERSION OF HYDROCARBONS AND CARBONACEOUS MATERIALS
Filed April 27, 1955 2 Sheets-Sheet 2
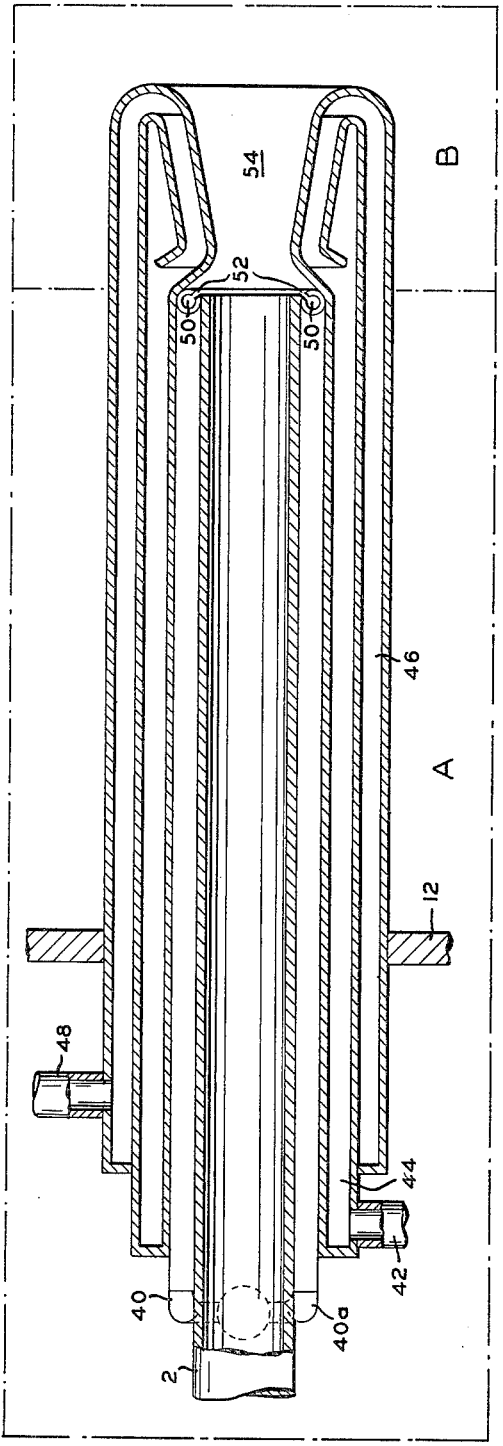
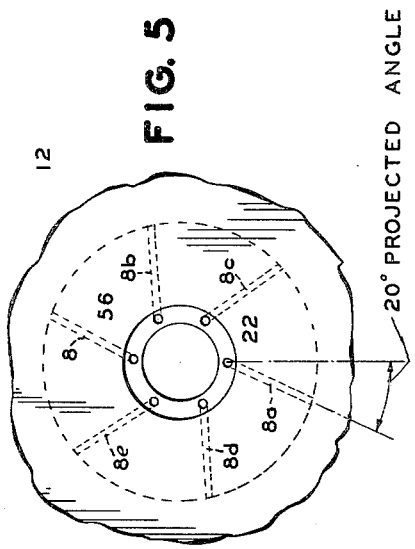
*INVENTOR.*
JOHN B. DWYER
BY
*H. H. Palmer*
ATTORNEYS 3,048,476
CONVERSION OF HYDROCARBONS AND CARBONACEOUS MATERIALS
John B. Dwyer, Baldwin, N.Y., assignor to The M. W. Kellogg Company, Jersey City, N.J., a corporation of Delaware
Filed Apr. 27, 1955, Ser. No. 504,229
6 Claims. (Cl. 23—284)

This invention relates to method and means of mixing gasiform materials. More particularly it relates to method and means of introducing gasiform reactants into a reaction zone. Still more particularly it relates to method and means for intimately mixing and introducing a hydrocarbon vapor, steam and oxgyen into a catalytic reaction zone.

This application is a continuation-in-part of my copending application Serial No. 365,970, filed July 3, 1953, now Patent No. 2,942,958.

Hydrogen and mixtures of hydrogen and carbon monoxide have found widespread use as synthesis materials in the preparation of various organic and inorganic compounds. For example, ammonia is prepared by the catalytic combination of hydrogen and nitrogen and mixtures of hydrogen and carbon monoxide are useful in the synthesis of hydrocarbons including those boiling in the gasoline range and oxygenated hydrocarbons such as alcohols and ketones.

Almost any petroleum fraction existing as a gas or liquid under atmospheric conditions or capable of being vaporized at an elevated temperature may be used as feed material in the preparation of hydrogen and/or carbon monoxide. Natural gas or normally gaseous hydrocarbons are preferred as feed materials because of their availability, ease of handling and resistance to cracking and carbon formation, however, heavier hydrocarbon fractions including gasoline, kerosene, naphtha, distillates, gas oils and residual oils have been used as feed materials. In addition, coal distillation gas and effluent from the gasification of coal have been found useful in preparing the synthesis gases.

Two general methods have been developed for the preparation of synthesis gas. The first, called partial oxidation, takes place in the manner illustrated by Reaction 1 and the second called reforming, takes place according to Reactions 2 and 3. Other side and intermediate reactions, not shown here, may also take place depending on the reaction conditions.

(1) $2CH_4 + O_2 \rightarrow 2CO + 2H_2$
(2) $CH_4 + H_2O \rightarrow CO + 3H_2$
(3) $CH_4 + CO_2 \rightarrow 2CO + 2H_2$ Either process can be carried out in the presence of a catalyst, however, in the case of partial oxidation a catalyst is not necessary although non-catalytic operation requires a substantially higher temperature than a catalytic process. The oxygen required in the partial oxidation reaction may be supplied as such or may be conveniently obtained by using air, a mixture of air and/or oxygen or a metal oxide. The oxygen required for reforming, as apparent from Reactions 2 and 3, is obtained from water or carbon dioxide or a combination thereof. Inasmuch as the partial oxidation reaction is exothermic and the reforming reaction is endothermic, it has been found desirable to combine the two processes to conserve thermal energy. In addition, by controlling the extent to which each reaction takes place, it is possible to control the ratio of hydrogen to carbon monoxide produced as is apparent from the above reactions.

One of the principle problems encountered in carrying out oxidation and reforming of hydrocarbons and carbonaceous materials to produce synthesis gas is the tendency for the reactions to proceed in such a manner that carbon or coke is formed. This decreases the yield of desirable products and in addition causes catalyst fouling and plugging of equipment which results in interrupted production and costly shutdowns.

It is an object of this invention to provide improved method and means for carrying out the partial oxidation and reforming of hydrocarbons and carbonaceous materials.

It is another object of this invention to provide improved method and means for preparing gases useful in the synthesis of hydrocarbons, ammonia and oxygenated organic compounds.

It is still another object of this invention to provide novel method and means for minimizing carbon deposition in the partial oxidation and reforming of hydrocarbons and carbonaceous material.

Still another object of this invention is to provide improved method and means for mixing and introducing gases into a catalytic reaction chamber.

Yet another object of this invention is to provide improved method and means for mixing and introducing a gaseous hydrocarbon and oxygen into a catalytic reaction zone.

Another object of this invention is to provide method and means for decreasing catalyst failure in the catalytic partial oxidation and reforming of hydrocarbons and carbonaceous materials.

Another object of this invention is to provide improved method and means for reducing erosion, corrosion and failure of nozzles used for the introduction of gaseous reactants into a partial combustion and reforming catalytic reaction zone.

In the method of this invention an oxygen containing gas is introduced into a stream of hydrocarbon vapor in the mixing section of a nozzle in the form of a plurality of streams of high velocity and small cross-section in such a manner that thorough mixing is obtained before the gases leave the mixing section. In one aspect of the invention the oxygen streams form a cone within the mixing chamber, the apex of which lies on the central longitudinal axis of the said chamber. In another aspect the oxygen streams are disposed so as to impart tangential motion to the oxygen with the result that the said streams converge in a circle perpendicular to the central longitudinal axis of the mixing zone and centered on said axis. In still another aspect this invention comprises introducing and mixing the gases according to the procedures described and further passing the gaseous mixture into a catalytic reaction chamber so that the gases leaving the mixing zone are immediately in contact with the catalyst.

As mentioned before, one of the most troublesome problems in carrying out reactions involving oxygen and hydrocarbons, more particularly in the partial oxidation and/or reforming of hydrocarbons to produce mixtures of hydrogen and carbon monoxide, is the formation of carbonaceous deposits. There are several disadvantages which may result from this. In general when a catalytic process is being utilized carbon formation is undesirable because the carbon deposits on the catalyst, thereby decreasing the activity of the catalyst and increasing the pressure drop through the catalyst bed. In either a catalytic or a non-catalytic process carbon deposition can mean equipment plugging and equipment failure with costly shutdowns and loss of production. Since carbon deposition is a result of failure to properly control reaction conditions, it is often accompanied by excessive temperatures which may lead to catalyst failure and where reactants are mixed prior to their introduction to the reaction zone, by failure of mixing equipment and nozzles or other equipment used for introducing the reactants.

Both partial oxidation and reforming of hydrocarbons are carried out at elevated temperatures, usually higher than the temperature at which initial cracking of the hydrocarbons, particularly the heavier hydrocarbons, occurs. It is difficult, therefore, in carrying out the preparation of a gas for use in the synthesis of ammonia, hydrocarbons and organic compounds to avoid passing through a temperature range which is conducive to carbon deposition. Although the reason therefor is not clearly understood, cracking of hydrocarbons to carbon takes place at a much lower rate when the partial oxidation and reforming reactions are carried out in the presence of a catalyst. Furthermore, combining these processes is a particularly effective means of suppressing carbon formation. The problem then is primarily one of getting the reactants through the carbon producing phase and into the catalyst mass as quickly as possible. Whether this is accomplished in a combination partial combustion and reforming process or whether partial combustion alone is contemplated is to be determined by various considerations, including feed material, product composition desired, extent of preheat, etc. In either event, the problem is the same and its solution lies within the scope of this invention.

As mentioned previously, the preparation of a synthesis gas may be carried out either with or without a catalyst. The reforming reactions in particular are benefitted by catalytic action. Partial combustion of hydrocarbons with oxygen in the presence of a catalyst is characterized by high temperatures, usually between about 1200° F. and about 2400° F., whereas reforming with steam or carbon dioxide is customarily carried out at a lower temperature between about 1200° F. and about 1800° F. Non-catalytic partial combustion requires still higher temperatures, that is, between about 2200° F. and about 3000° F. The nature of the reactions is such that reforming supplies a substantially higher hydrogen to carbon monoxide ratio than does partial combustion. As a result flexibility in product distribution is obtained by using the combined process. In addition, the thermodynamics of reforming and partial combustion make a combined conversion process especially attractive since the heat required for reforming is supplied from the heat given off in the exothermic partial combustion reactions. These constitute excellent reasons for combining reforming and partial combustion rather than carrying them out separately. The application of this invention will be discussed in conjunction with a combined process, however, this is not intended in any way to limit the scope of the invention.

Numerous catalysts are available for carrying out the reforming of hydrocarbons. Especially preferred are nickel, chromium, cobalt and oxides thereof which may be used either singly or in mixtures of varying composition. Similar catalysts are also effective in carrying out partial combustion of hydrocarbons. For best results the catalyst is used in combination with a conventional high temperature refractory material such as alumina, zirconia, firebrick, etc., preferably by being deposited or supported thereon. The percentage of metal or metal oxide combined with the refractory varies from as low as about 5 percent to as high as about 30 percent depending upon the reaction conditions, catalyst and product composition desired.

In carrying out a typical combined catalytic reforming and partial combustion process a hydrocarbon material, for example, a normally gaseous hydrocarbon such as methane, ethane or propane or a coal gas or a methane from the gasification of coal or a hydrocarbon or a mixture of hydrocarbons, normally liquid but vaporizable at temperatures below about 1000 to 1400° F., for example, gasoline, kerosene, distillates, gas oil, etc., is preheated to between about 1000 and about 1400° F. The high level of preheat is desirable for two reasons. First, it decreases the amount of heat which otherwise would have to be supplied from the partial combustion reactions and thereby decreases oxygen consumption. Second, preheating the hydrocarbon feed to a high temperature before combining it with oxygen makes it possible to pass more quickly through the temperature range in which carbon deposition takes place.

The preheated hydrocarbon, and oxygen and an inert diluent such as steam and/or $CO_2$ which also may be preheated, are introduced into a reaction chamber. These streams may be combined before or during their passage into said chamber. Inasmuch as the presence of steam or $CO_2$ has an inhibitive effect on carbon formation it is usually preferred to combine the diluent and hydrocarbon before adding the oxygen. Varying amount of oxygen and diluent are used in carrying out this process, however, more usually, oxygen is provided in an amount between about 0.3 and 0.7 mols per mol of carbon equivalent of hydrocarbon and the diluent for reforming is supplied in a ratio between about ½ and about 2 mols per mol of carbon equivalent.

The reaction chamber contains one or more of the catalysts previously described. When a non-fluid system is utilized, the catalyst comprises either a bed of irregular fragments of varying size or compounded pellets or other regular shapes, usually of uniform size. When the process is being carried out as a fluid operation the catalyst is distributed in the conventional dense fluidized bed as finely divided particles. In either case a dense catalyst bed is maintained into which the reactants are introduced for conversion of the hydrocarbon to a mixture of hydrogen and carbon monoxide.

In a preferred embodiment of this invention the hydrocarbon, steam and/or $CO_2$ diluent, and oxygen are introduced as a mixture into the reaction chamber in such a manner as to substantially eliminate carbon deposition and provide a process wherein equipment failure due to erosion and excessive temperature is minimized and in which catalyst failure is substantially eliminated. These objectives are accomplished by improved methods of mixing the reactants prior to their admission to the reaction zone and by an improved method of contacting the reactants and the reforming catalyst.

In carrying out the invention the hydrocarbon and diluent are preheated, mixed and introduced through a confined zone into the mixing portion of a feed nozzle. An oxygen-containing gas is introduced around the periphery of the flow stream comprising the hydrocarbon-diluent mixture. Two expedients are used to promote mixing of the reactants. One comprises introducing the oxygen in the form of a plurality of high velocity streams of small cross-section at an angle to the longitudinal axis of the mixing zone in such a manner that the streams meet on the longitudinal axis thereby forming a cone having its apex on this axis. The angle formed by each oxygen stream and the axis of the mixing zone is preferably maintained between about 30 degrees and about 60 degrees, although it may vary from at low as 15 degrees to as high as 75 degrees. The oxygen streams are sized and are of a sufficient number to provide a velocity relative to the hydrocarbon-stream mixture between about 3 to 1 and about 12 to 1, or more preferably between about 5 to 1 and about 8 to 1. The second expedient includes the aforementioned method plus introducing each of the oxygen streams at an angle displaced from the longitudinal axis of the mixing zone so that a tangential motion is imparted to the oxygen gas streams and so that the streams converge to form a circle around the axis of flow rather than a cone. The velocity relationship given for the first expedient is also maintained here and the angle of displacement is defined by the limits set forth above for the angle between the oxygen streams and the longitudinal axis of the mixing zone. The primary purpose of both of these methods is to provide for speedy, intimate mixing of the reactants thereby preventing spots of high oxygen concentration which would produce localized overheating with damage to the walls of the mixing zone. Where the mixing is inadequate, tests have shown that this does occur and results in nozzle damage either because of mechanical failure or because of a combination of erosion, corrosion, fusion, and mechanical failure.

Although the methods of introducing oxygen described above contemplate symmetrical oxygen flow patterns, it is within the scope of this invention to operate according to the first method with the oxygen streams so disposed as to shift the apex of the cone from the longitudinal axis. Likewise the angles of entry of the oxygen streams when utilizing the second expedient may be varied so that the streams form a non-circular path of convergence and one that is not necessarily centered on the axis of flow.

It has been found, as mentioned in my copending application Serial No. 365,970, that flame combustion does not occur before the reactants contact the catalyst if the time interval, which elapses between mixing of the reactants and entry of the mixture into the catalyst bed, is sufficiently short, that is, not more than 0.2 second and preferably between about 0.01 and about 0.05 second. Once the reactants enter the catalyst bed, heat is absorbed by the endothermic reforming reactions which occur simultaneously with partial oxidation. This prevents excessive temperature rise and possible catalyst and equipment failure. In order to limit the aforementioned time of non-catalytic contact of the reactants, a nozzle location close to the catalyst bed is preferred, usually between about 4 inches and about 12 inches from said bed. In addition, the velocity of the reactants after admixing is maintained above about 10 feet per second and preferably between about 50 and about 150 feet per second.

It has also been found, however, that even though carbon deposition is minimized by this method of operation the high velocity of the reactant gases striking the catalyst is sufficient at the temperature prevailing at the point of contact to cause spalling of the catalyst. Catalyst disintegration not only reduces the effectiveness of the catalyst but also rapidly increases pressure drop through the catalyst bed. This difficulty is eliminated to a great extent by introducing the reactants below rather than above the top level of the catalyst. Apparently this provides a greater catalytic reaction surface which decreases the temperature rise in the top portion of the bed so that the combined effect of high vapor velocity and high temperature does not exceed the mechanical strength of the catalyst.

With either type of operation, the maximum temperature reached in the top of the catalyst bed varies between about 1800 and about 2200° F. decreasing in the direction of flow by about 150° F. to about 500° F. at the bottom of the bed. Although this operation may be carried out at either atmospheric or elevated pressure, a pressure between about 150 and about 350 p.s.i.g. is preferred.

In order to more clearly define the invention and to provide a better understanding thereof, reference is had to FIGURES 1, 2, 3 and 4 which are diagrammatic views in cross-section of typical nozzles employed in carrying out a preferred embodiment of the invention, and FIGURE 5 which illustrates a typical pattern formed by the oxygen streams in the mixing sections of the nozzles illustrated.

The nozzle in FIGURE 1 is conveniently divided into two sections, an introduction section A and a mixing section B. The introduction section includes a cylindrical block 4 constructed of stainless steel and hollowed to allow passage therethrough of gaseous reactants, namely, hydrocarbon and steam. Attached to and openly communicating with the block at one end is a conduit 2 through which the hydrocarbon and steam are admitted to the block. At the opposite end of the block, also attached thereto and openly communicating therewith is a mixing section B. The hollow portion 10 of the block extending from conduit 2 to the mixing section B is tapered in the direction of flow to provide space for entry of oxygen streams around the periphery of the stream of hydrocarbon and steam entering the mixing section, which is somewhat smaller in cross-section than conduit 2. An annular passageway 7 within the block 4 serves as a distribution header for oxygen which is admitted into the block through conduit 6. The oxygen passes from the distribution header through small tubular passageways 8, 8a, 8b, 8c, etc., six in number, disposed in the block in such a manner as to provide high velocity streams of oxygen which intersect the central longitudinal axis of the mixing section at a 30° angle to the horizontal thereby forming a cone having its apex on said axis.

The mixing section B comprises a cylindrical conduit 22 constructed of stainless steel and of sufficient length to insure thorough mixing of the reactant gases before they enter the catalyst bed. To provide cooling of conduit 22 a suitable cooling fluid, for example water, is passed through cooling jackets 16 and 20, which are also constructed of stainless steel. Jacket 20 which serves as the entrance or first jacket is adjacent to conduit 22. The cooling medium is supplied thereto through conduit 24, passes through the jacket parallel to the direction of flow of the reactants in conduit 22 and into jacket 16, which surrounds jacket 20, through openings 18. The cooling fluid after passing through the latter jacket in a reverse direction is discharged through conduit 14.

The nozzle is so constructed that the entire mixing section lies within the reaction chamber and is separated from the introduction section by plate 12 which forms the wall of the reaction chamber. In order to prevent excessive heat loss from the nozzle it may be desirable to lag conduits 14 and 24 and to surround the entire mixing section with insulation or refractory material.

Figure 2:
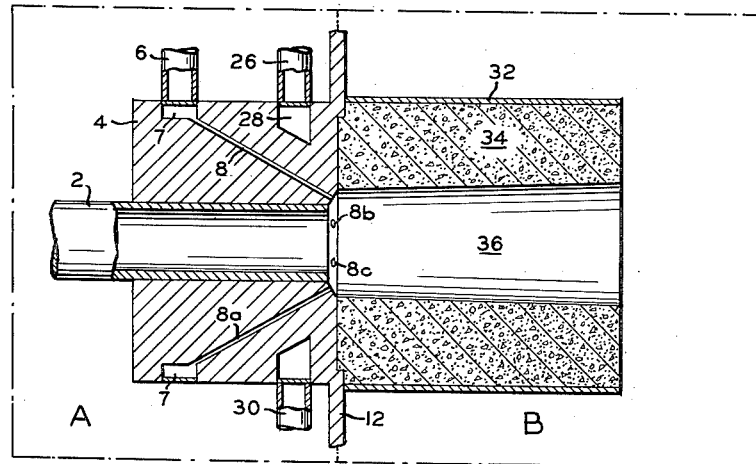
Figure 3:
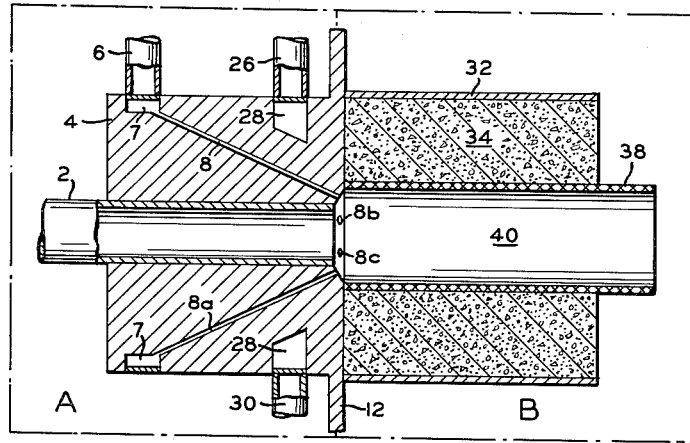

The nozzle illustrated by FIGURE 2 differs substantially from the preceding nozzle. Here the mixing section comprises a mass of refractory material 34 surrounded and supported by a metal support 32 and hollowed to form a mixing passageway cylindrical in shape and tapered outwardly in the direction of flow. The purpose of the taper is to provide an increasing cross-section of flow as the heated gases expand. Similar to the nozzle in FIGURE 1 the entire mixing section lies within the catalyst chamber as defined by the metal wall 12. With this type of nozzle construction it is unnecessary to provide cooling of the mixing section, however, since heat losses to the nozzle block 4 may also be substantial, this nozzle includes means for cooling the block, which comprises an annular passageway 28 through which the cooling fluid is passed and conduits 26 and 30 for admitting and removing said fluids. In other respects, for example, the method of introducing the reactants, the size of the introduction and mixing sections, etc., the two nozzles are very similar. The nozzle in FIGURE 3 is the same as the nozzle in FIGURE 2 with the exception that the mixing zone 40 comprises a cylindrical conduit 38 constructed of a high mechanical strength refractory material and surrounded by a refractory mass 34 of lower mechanical strength, the entire mixing section being supported and enclosed by a metal support 32. When operating with the nozzle below the level of the catalyst bed, it is not necessary to insulate that portion of the nozzle which is buried in the catalyst. As a result, conduit 40 is extended beyond refractory 34, a distance equal to the depth of the nozzle in the catalyst bed.

FIGURE 4 illustrates a nozzle constructed entirely of metal, preferably stainless steel, embodying features common to the nozzles in FIGURES 1, 2 and 3. In this nozzle, the major portion of the introduction section A as well as the mixing section B lie within the reaction chamber. Both sections are cooled by indirect heat exchange with a fluid coolant which is introduced through conduit 42 into an annular space 44, passes parallel to the reactant flow through the length of the nozzle, enters a second annular space 46 where the flow is reversed, returns to the introduction section and exits through conduit 48. The mixing section 54 of the nozzle is formed by the inner wall which encloses the cooling zone 44. Oxygen is introduced through conduits 40 and 40a which lie parallel to feed conduit 2, passes parallel to conduit 2 into a circular ring 50 and is introduced through openings 52 into the mixing zone 54 in the form of high velocity streams of small cross-section. As in the previous nozzles, the oxygen streams converge at an angle of 30° to form a cone having its apex on the central longitudinal axis of the mixing zone 54.

FIGURE 5 illustrates the pattern formed by the oxygen streams entering the mixing section of the nozzle in FIGURE 1 when the said streams enter in the manner previously described and in addition are displaced so as to impart to the oxygen a tangential motion. The degree of displacement is 20° in the specific embodiment presented.

Although six oxygen streams are shown in this illustration and are called for the nozzles previously described, it is within the scope of this invention to have any number of such streams as long as the velocity relationships previously discussed are maintained. Introducing the oxygen in this manner provides a number of small high velocity streams which converge to form a circle 56 around the central longitudinal axis of the mixing zone 22. The swirling action which results is very beneficial in effecting through mixing of the reactants. This method of introducing the oxygen is, of course, also applicable to the nozzles in FIGURES 2, 3 and 4.

The illustrated nozzles present a few of the variations which are possible in carrying out this invention. The advantages and disadvantages presented by each specific nozzle will be apparent to those skilled in the art and will not be gone into in detail. The important result which is obtained in all of the nozzles described is thorough mixing of the reactants prior to their exit from the nozzle and in such a manner that the oxygen is evenly distributed in the hydrocarbon and steam so that no impingement of oxygen on the inner wall of the mixing zone occurs.

Various refractory materials are used in forming the mixing zones illustrated in FIGURES 2 and 3 and in insulating the mixing sections illustrated in FIGURES 1 and 4. For example, refractories having as their principal constituent, zirconia, alumina, silicon-carbide, and similar materials possess properties which make them particularly applicable in this service. Zirconia ram mix finds special use as a general insulating refractory and both silicon-carbide and high mechanical strength fired zirconia are used in constructing the cylindrical conduit which forms the mixing zone of the nozzle in FIGURE 3. The specific nozzles illustrated have metal parts constructed of stainless steel, however, other high temperature metals are also used within the scope of this invention.

As mentioned previously, it is desirable to have at the most a short space between the outlet of the nozzle mixing zone and the top of the catalyst bed. To prevent spalling of the catalyst however, a more preferable operation is that in which the nozzle extends slightly below the catalyst level.

To illustrate a typical application of the invention, the following specific example is presented in conjunction with the nozzle shown in FIGURE 1.

Feed material comprising a mixture of methane and steam preheated to about 1000° F. and in a ratio of about 1.5 mols of steam per mol of methane is introduced through conduit 2 into mixing zone 22. Oxygen for the partial combustion reaction is introduced into header 7 in block 4 through conduit 6 and passes through six tubular zones 8, 8a, 8b, 8c, etc., into the mixing zone 22. The quantity of oxygen is controlled to provide a ratio of about 0.5 mol of oxygen per mol of methane.

The aforesaid tubular zones are disposed in the block to provide streams of oxygen which are displaced as shown in FIGURE 5 so as to converge in a circle around the central longitudinal axis of the mixing zone. Uniform spacing of the oxygen streams around the periphery of the hydrocarbon-steam mixture and the displacement given to the oxygen streams provides a uniform tangential flow of oxygen into the mixing zone. This, in conjunction with a high velocity of the oxygen streams, relative to the hydrocarbon-steam mixture, viz. about 6 to 1, provides fast and thorough mixing of the reactants. The combined velocity of the total reactant stream after mixing is about 20 feet per second and is sufficient to provide a total residence time within the nozzle after mixing of less than 0.05 second.

Immediately after the gases come in contact, some reaction between the oxygen and hydrocarbon takes place and quantities of heat are given off. To prevent overheating of the walls of the mixing zone, water is circulated through annular spaces 20 and 16, entering through conduit 24 and leaving through conduit 14.

The outlet portion of the nozzle is buried beneath the catalyst level so that the gases leaving the nozzle are immediately in contact with catalyst. In this particular operation the catalyst comprises nickel-oxide deposited on alumina, disposed in the catalyst chamber as irregular fragments to form a non-fluid fixed bed. The temperature of the reactants increases rapidly during their passage through the nozzle and the gases leaving the mixing zone 22 are sufficiently heated to provide a top catalyst temperature of about 2000° F. When the reactants leave the nozzle and contact the reforming catalyst endothermic reforming reactions immediately take place. These reactions proceed with such rapidity that they not only absorb the heat released in the concurrent partial combustion reactions but also remove sensible heat from the reactants and reaction products and gradually lower the temperature in the direction of flow. As a result, the temperature of the gases leaving the bottom of the bed is reduced to about 1600° F.

In this specific operation the product gas is used in the synthesis of hydrocarbons, therefore, the preceding process is carried out at a pressure of about 300 pounds per square inch gage in order to match the pressure required in the synthesis unit.

Having described the invention by reference to a specific application, it should be understood that no undue restrictions or limitations should be imposed by reason thereof, but that the scope of the invention is defined by the appended claims.

I claim:

1. A nozzle comprising a mixing section of constant flow path having walls disposed about an axis of revolution, conduit means for introducing a first gasiform material into said mixing section along a flow path having an axis common to said axis of revolution, plural conduit means for introducing a second gasiform material disposed tangentially to said mixing section walls and peripherally about said first-named conduit means and having a cross sectional area which is small in comparison therewith and means for circulating the fluid coolant in indirect heat exchange relationship with said mixing section.

2. A nozzle comprising a mixing section of constant flow path having cylindrical walls with elements disposed about an axis of revolution, conduit means for introducing a first gasiform material into said mixing section along a flow path having an axis common to said axis of revolution, plural conduit means for the introduction of a second gasiform material disposed tangentially to said cylindrical mixing section walls and peripherally to said first-named conduit means and having a cross sectional area which is small in comparison therewith, each of said plurality conduit means forming an angle with said cylindrical axis between 15° and 75° and means for circulating a fluid coolant in indirect heat exchange relationship with said mixing section.

3. A nozzle comprising a feed introduction section and a mixing section of constant flow path having walls disposed about an axis of revolution, conduit means passing through said feed introduction section and communicating with said mixing section along said axis, plural conduit means passing through said feed introduction section and communicating with said mixing section disposed tangentially to the walls of said mixing section and having a cross sectional area small in comparison with the cross sectional area of said first-named conduit and a jacket enclosing the feed introduction and mixing sections and forming a peripheral space through which a cooling fluid may be circulated.

4. A nozzle comprising a feed introduction section and a mixing section of constant flow path having walls disposed about an axis of revolution, conduit means passing through said feed introduction section and communicating with said mixing section along said axis, plural conduit means passing through said feed introduction section and communicating with said mixing section disposed tangentially to the walls of said mixing section and having a cross sectional area small in comparison with the cross sectional area of said first-named conduit and a jacket enclosing the mixing section and forming a peripheral space through which a cooling fluid may be circulated.

5. A nozzle comprising a feed introduction section and a mixing section of constant flow path having walls disposed about an axis of revolution and surrounded by a mass of refractory material which in turn is surrounded by a metal support, conduit means passing through said feed introduction section and communicating with said mixing section along said axis, plural conduit means passing through said feed introduction section and communicating with said mixing section disposed tangentially to the walls of said mixing section and having a cross sectional area small in comparison with the cross sectional area of said first-named conduit and means for circulating a fluid coolant in indirect heat exchange relationship with said introduction section.

6. A nozzle comprising a feed introduction section and a mixing section of constant flow path comprising a cylindrical refractory tube surrounded by a mass of refractory material of lower mechanical strength than said tube, which in turn is surrounded by a metal support, conduit means passing through said feed introduction section and communicating with the interior of said cylindrical refractory tube along the axis thereof, plural conduit means passing through the said feed introduction section communicating with the interior of said cylindrical refractory tube, said plural conduit means being disposed tangentially to the walls of said cylindrical refractory tube and having a cross sectional area which is small in comparison with the cross sectional area of the first-named conduit and means for circulating a fluid coolant in indirect heat exchange relationship with said introduction section.

References Cited in the file of this patent

UNITED STATES PATENTS

| | | |
|---|---|---|
| 1,438,032 | Frost | Dec. 5, 1922 |
| 1,448,655 | Durrah | Mar. 13, 1923 |
| 1,765,672 | Huff | June 24, 1930 |
| 2,071,119 | Harger | Feb. 16, 1937 |
| 2,368,827 | Hanson et al. | Feb. 6, 1945 |
| 2,420,999 | Ayers | May 27, 1947 |
| 2,548,286 | Bergstrom | Apr. 19, 1951 |
| 2,572,338 | Hartwig et al. | Oct. 28, 1951 |
| 2,708,621 | Shapleigh | May 17, 1955 |
| 2,767,785 | Eastman et al. | Oct. 23, 1956 |